United States Patent [19]

Boulton

[11] Patent Number: 4,737,257

[45] Date of Patent: Apr. 12, 1988

[54] ELECTRODE FOR ELECTROCHEMICAL CELL

[75] Inventor: Thomas Boulton, Frodsham, England

[73] Assignee: Imperial Chemical Industries PLC, London, England

[21] Appl. No.: 849,374

[22] Filed: Apr. 8, 1986

[30] Foreign Application Priority Data

Apr. 18, 1985 [GB] United Kingdom ............... 8509957

[51] Int. Cl.⁴ ............................................. C25B 11/04
[52] U.S. Cl. .............................. 204/291; 204/290 R; 204/292; 204/252; 204/242
[58] Field of Search ................................. 204/252–258, 204/263–270, 290 R, 291–293, 242

[56] References Cited

U.S. PATENT DOCUMENTS

| 1,043,937 | 11/1912 | Huth | 204/291 |
| 2,901,455 | 8/1959 | Jurras | 204/292 |
| 4,118,294 | 10/1978 | Pellegri | 204/291 |
| 4,231,854 | 11/1980 | Boehlke et al. | 204/291 |
| 4,265,727 | 5/1981 | Beckley | 204/242 |
| 4,401,519 | 8/1983 | Kadija et al. | 204/292 |
| 4,446,210 | 5/1984 | Okada et al. | 429/42 |
| 4,502,929 | 3/1985 | Stewart et al. | 204/291 |

FOREIGN PATENT DOCUMENTS

| 0132425 | 1/1985 | European Pat. Off. | 204/291 |
| 2164817 | 8/1973 | France | 429/42 |
| 2304184 | 10/1976 | France | 429/42 |
| 1535997 | 12/1978 | United Kingdom . | |

Primary Examiner—John F. Niebling
Assistant Examiner—Kathryn Rubino
Attorney, Agent, or Firm—Cushman, Darby & Cushman

[57] ABSTRACT

An electrode for use in an electrochemical cell and comprising a composition of a mixture of a plastics material and an electrically conducting fibrous material which has a ratio of length to diameter (L/D) of at least 50, and preferably at least 100. The composition may comprise 1% to 10% by volume of electrically conducting fibrous material and the plastics material is preferably a thermoplastic material.

17 Claims, 1 Drawing Sheet

U.S. Patent
Apr. 12, 1988
4,737,257
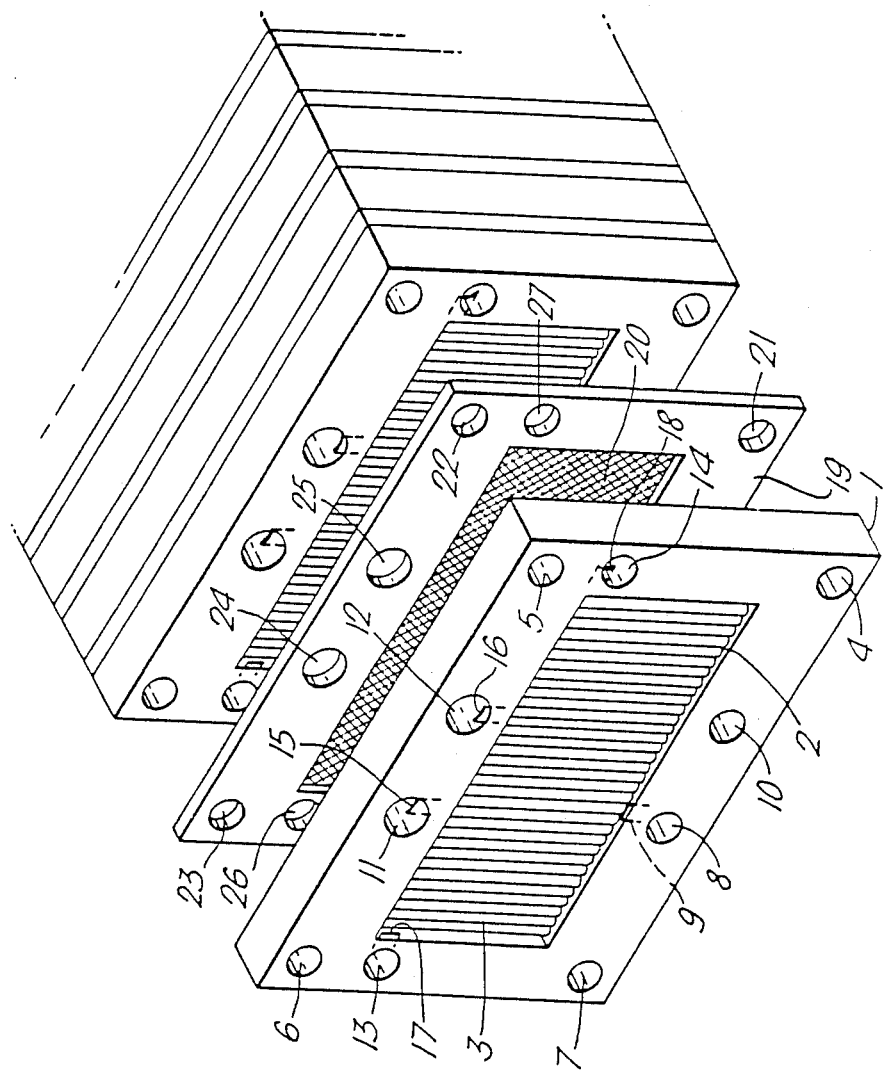

ELECTRODE FOR ELECTROCHEMICAL CELL

The invention relates to an electrode which is suitable for use in an electrochemical cell, and it relates in particular to an electrode which comprises a substrate of an organic plastics material and which may be used in a wide variety of different types of electrochemical cell.

Electrochemical cells are used in a wide variety of different types of application. For example, the electrochemical cell comprising an anode and a cathode and a suitable electrolyte may function as a battery, that is, as a source of electrical power. The battery may be of the primary type or of the secondary type. The electrochemical cell may be a fuel cell. In a further application the electrochemical cell may function as an electrolytic cell to which electrical power is supplied in order to electrolyse an electrolyte in the cell.

The electrode of the present invention may be used in a wide variety of different types of electrochemical cell, but it is particularly suitable for use in an electrolytic cell in which an electrolyte is electrolysed. Examples of such electrolysis are the electrolysis of aqueous alkali metal chloride solution to produce chlorine, hydrogen, and aqueous alkali metal hydroxide solution, that is chlor-alkali electrolysis, and electrolysis of aqueous alkali metal chloride solution to produce aqueous alkali metal chlorate and hydrogen.

Aqueous solutions of alkali metal chloride, particularly sodium chloride, are electrolysed on a vast scale throughout the world in order to produce chlorine and aqueous alkali metal hydroxide solution. The electrolysis may be effected in an electrolytic cell comprising a plurality of anodes and cathodes with each anode being separated from the adjacent cathode by a separator which divides the electrolytic cell into a plurality of anode and cathode compartments.

The electrolytic cell is provided with means for feeding aqueous alkali metal chloride solution to the anode compartments of the cell, and with means for removing the products of electrolysis therefrom. Also, the electrolytic cell is provided with means for removing products of electrolysis from the cathode compartments of the cell, and optionally with means for feeding water or other fluid thereto.

The electrolytic cell may be of the diaphragm or membrane type. In the diaphragm type cell the separators positioned between adjacent anodes and cathodes are microporous and in use aqueous alkali metal chloride solution passes through the diaphragms from the anode compartments to the cathode compartments of the cell. In the membrane type cell the separators are essentially hydraulically impermeable and are cationically permselective and in use ionic species, that is alkali metal ions, are transported across the membranes between the anode compartments and the cathode compartments of the cell.

Where aqueous alkali metal chloride solution is electrolysed in an electrolytic cell of the diaphragm type, the solution is fed to the anode compartments of the cell, chlorine which is produced in the electrolysis is removed from the anode compartments of the cell, the alkali metal chloride solution passes through the diaphragms and hydrogen and alkali metal hydroxide produced by electrolysis are removed from the cathode compartments, the alkali metal hydroxide being removed in the form of an aqueous solution of alkali metal chloride and alkali metal hydroxide. Where an aqueous alkali metal chloride solution is electrolysed in an electrolytic cell of the membrane type the solution is fed to the anode compartments of the cell and chlorine produced in the electrolysis and depleted alkali metal chloride solution are removed from the anode compartments, alkali metal ions are transported across the membranes to the cathode compartments of the cell to which water or dilute alkali metal hydroxide solution may be fed, and hydrogen and alkali metal hydroxide solution produced by the reaction of alkali metal ions with water are removed from the cathode compartments of the cell.

The electrolysis may be effected in an electrolytic cell of the filter press type which may comprise a large number of alternating anodes and cathodes, for example, fifty anodes alternating with fifty cathodes, although the cell may comprises even more anodes and cathodes, for example up to one hundred and fifty alternating anodes and cathodes.

In electrochemical cells the electrodes which are used, that is the anodes and cathodes, are generally metallic, the nature of the metal being determined by the function of the electrode, that is whether it is to be used as an anode or as a cathode, and by the nature of the electrolyte and of the products of electrolysis. For example, in an electrolytic cell in which an aqueous alkali metal chloride solution is electrolysed the anode is generally made of a film-forming metal, e.g. titanium or an alloy thereof, having a coating of an electroconducting electro-catalytically-active material, e.g. a coating containing an oxide of a platinum group metal, and the cathode may be, for example, iron, copper or nickel, although cathodes of the other metals may be used if desired.

Electrodes comprising a non-metallic substrate, for example, a substrate of an organic plastics material, are used in certain types of electrochemical cell, in particular in electrochemical cells which function as batteries, and such electrodes have also been proposed for use in electrolytic cells, e.g. in electrolytic cells for the electrolysis of aqueous alkali metal chloride solution.

The substrate must be modified in order to impart electrical conductivity thereto.

There have been many prior proposals of electrodes comprising a substrate of an organic plastics material.

U.S. Pat. No. 4,098,967 describes a bipolar electrode for use in a lead-acid type battery which comprises a substrate of a plastics material filled with 40% to 80% by volume of carbon. The plastics material may be a fluorocarbon, e.g. polyvinylidene fluoride.

French Pat. No. 1 491 996 describes production of an electrode by grinding a conductive catalytic material and mixing the material with an emulsion of a halogenated hydrocarbon polymer to form a gel, compressing the gel, and sintering the compressed gel.

U.S. Pat. No. 3,329,530 describes a fuel cell electrode which is a sintered product of 50 to 95% by volume of electrically conductive material, e.g. carbon or nickel, and 50 to 5% by volume of a copolymer of tetrafluoroethylene and another fluorine-containing monomer.

U.S. Pat. No. 4,125,680 describes a bipolar electrode which comprises 10 to 50% by weight of carbon and 90 to 50% by weight of a plastics material, which latter material may be a thermoplastic or a thermoset.

European Patent Publication No. 0 056 725 describes an electrode made by dry processing an electrode material, a polymeric pore-forming material, a support polymer, and a fibrillatable polymer, fibrillating the latter, and dissolving out the pore-forming polymeric material. The electrode material may be a fine powder of, for example, platinum group metal, manganese, lead or nickel.

U.S. Pat. No. 4,350,608 describes an air cathode for use in a chlor-alkali cell in which the cathode is made by sintering under high pressure a prefused mixture of carbon and polytetrafluoroethylene, and depositing an electrocatalyst on the surface of the cathode thus formed.

West German Pat. No. 2 905 180 describes an electrode for use in the electrolysis of water which is a composite of a reinforcing metal mesh onto which a powder mixture of graphite and polytetrafluoroethylene is pressed and sintered and which is impregnated with a mixture of platinum group metal oxides as catalyst.

French Pat. No. 2 439 826 describes a dimensionally stable anode made by moulding a mixture of a powdered valve metal, and 5 to 50% by weight of a thermosetting or thermoplastic resin. Epoxides, phenols, bisphenols and polytetrafluoroethylene are disclosed as resins, and noble metal powders or their oxides may be mixed with the resin.

Where an electrode comprises a substrate of an organic plastics material it is essential to admix an electrically conducting material with the plastics material in order to achieve the necessary electrical conductivity in the thus formed mixture. It may be necessary to admix a substantial proportion of such electrically conductive material with the plastics material, for example 100% or more of electrically conductive material by weight of the plastics material, in order to achieve the required electrical conductivity in the resultant electrode, particularly when the electrically conductive material is a powdered material.

The present invention relates to an electrode fabricated from a composition comprising a plastics material admixed with an electrically conductive material in which, in order to attain the necessary electrical conductivity so that the composition will function as an electrode, it is unnecessary to use such a high proportion of electrically conductive material.

According to the present invention there is provided an electrode suitable for use in an electrochemical cell and comprising a composition comprising a mixture of a plastics material and an electrically conducting fibrous material which fibrous material has a ratio of length to diameter of at least 50.

The ratio of length to diameter of the fibrous material will hereinafter be referred to as the L/D ratio.

The proportion of fibrous material which is required in the composition of the electrode in order to provide the necessary electrical conductivity, or resistivity, depends on a number of factors, for example, on whether the electrode is to be used as a monopolar or as a bipolar electrode, on the L/D ratio of the fibrous material, and on the conductivity of the fibrous material. Thus, where the electrode is to be used as a monopolar electrode a lower electrical resistivity, and thus a higher electrical conductivity, may be required in the electrode than is the case for a bipolar electrode, and for a given L/D ratio in the electrically conducting fibrous material it may be necessary to use a larger proportion of fibrous material where the electrode is to be used as a monopolar electrode than is the case where it is to be used as a bipolar electrode. In order to achieve in the electrode a given electrical resistivity the proportion of electrically conducting fibrous material which is required may be lower the greater is the L/D ratio of the fibrous material. In order to achieve a given electrical resistivity, a lower proportion of fibrous material will be required the greater is the electrical conductivity of the fibrous material. The electrical resistivity of the electrode is also dependent on the thoroughness of the distribution of the fibrous material throughout the composition, and it is preferred that the plastics material and the electrically conducting fibrous material be thoroughly and homogenously mixed in the composition. The electrical resistivity of the electrode may also be dependent on whether or not an electrically conductive material other than the fibrous material is present in the electrode, e.g. a powdered electrically conductive material. Where such other material is present the proportion of fibrous material required to achieve a given electrical resistivity in the electrode may be lower.

As it may be necessary to use a lower proportion of electrically conducting fibrous material the greater is the L/D ratio of the fibrous material it is preferred that the L/D ratio of the fibrous material be at least 100. The L/D ratio may be considerably greater than 100, for example it may be as great as 500, or possibly as great as 1000. The use of some electrically conducting fibrous material having an L/D ratio of less than 50 is not excluded.

In general the composition of the electrode will comprise at least 0.25% by volume, generally at least 1% by volume of electrically conducting fibrous material, having an L/D ratio of at least 50, although the proportion required will depend in part on the factors herein referred to. The proportion of fibrous material will be selected to achieve the desired electrical resistivity in the electrode. The composition may contain up to 5%, or even more than 5%, by volume of the electrically conducting fibrous material. For example it may contain as much as 10% or even 20% by volume of the fibrous material, although in general it will be unnecessary to use such high proportions by volume of the fibrous material.

Where the electrode is to be used as a bipolar electrode it is preferred that the electrode comprising the composition of plastics material and the electrically conducting fibrous material has a bulk electrical resistivity of less than $10^{-1}$ ohm cm. Where the electrode is to be used as a monopolar electrode it is preferred that the electrode comprising the plastics material and the electrically conducting fibrous material has an electrical resistivity of less than $10^{-4}$ ohm cm, although the bulk resistivity may be above this latter value in the case where the monopolar electrode incorporates a current distributor, as will be described hereinafter.

In order to facilitate homogeneous mixing of the composition of electrically conducting fibrous material and plastics material it is preferred that the diameter of the fibrous material be small, e.g. 2 mm or less. The diameter of the fibrous material may be 1 mm or less, or 0.05 mm or less. In general the diameter of the fibrous material will be at least 0.002 mm.

The electrically conducting fibrous material may be metallic, and selection of the particular metal to be used will depend at least in part on the use to which the electrode is to be put. For example, where the electrode is to be used as an anode, e.g. in a chlor-alkali cell, the metal may be a film-forming metal, that is a metal selected from titanium, zirconium, tantalum, niobium and tungsten. Where the electrode is to be used as a cathode the metal may be, for example, iron, copper, or nickel. Other metals may be used, for example, silver or aluminium.

The electrically conducting fibrous material may be a substrate fibrous material which is not itself electrically conducting and which has an electrically conducting coating thereon, e.g. a metallic coating thereon. The electrically non-conducting fibrous material may be glass fibre, or it may be an organic polymeric material, for example, a polyolefin fibre, e.g. polypropylene; a polyamide fibre, e.g. polyhexamethylene adipamide; or a polyester fibre, e.g. polyethylene terephthalate. The metallic coating on the surface of the fibrous material is preferably one which is readily applied to the fibrous material, for example, by deposition from a solution of a compound of the metal, e.g. by electroless plating.

The composition of the electrode may comprise a mixture of two or more different electrically conducting fibrous materials, and it may comprise two or more forms of the same fibrous material which have different L/D ratios.

The plastics material may be a thermoplastic organic polymeric material or a thermosetting organic polymeric material. Where the plastics material is a thermoplastic material it may be, for example, a polyolefin, e.g. polyethylene, polypropylene, or an elastomeric polyolefin, e.g. an ethylene-propylene copolymer elastomer or an ethylene-propylene-diene copolymer elastomer. Polyolefins have the advantage that they are readily bonded to each other or to other plastics materials, e.g. by heat welding, ultrasonic welding, or by the use of adhesives, and electrodes made of such plastics materials may readily be assembled into an electro-chemical cell, as will be described hereafter.

The plastics material may be a halogenated polyolefin, for example, polyvinyl chloride. Preferred halogenated polyolefins are fluorine-containing polyolefins, for example polyvinylidene fluoride, polyhexafluoropropylene, fluorinated ethylene-propylene copolymer, and particuarly polytetrafluoroethylene, on account of the corrosion resistance of such fluorinecontaining polyolefins, e.g. in chlor-alkali cells.

A preferred thermoplastic material is an acrylonitrile-butadiene-styrene polymer. Such a plastics material is well known in the art and is readily available commercially. It is surprisingly resistant to the corrosive liquors in a chlor-alkali cell, and it is readily fabricated by a number of different plastics processing techniques, e.g. injection moulding, compression moulding, and extrusion.

A composition of a homogeneous mixture of thermoplastic material and electrically conducting fibrous material may be formed by application of techniques well-known in the plastics processing art. For example, fibrous material and thermoplastic material may be mixed in apparatus equipped with bladed mixers.

Alternatively, or in addition, the fibrous material and themoplastic material may be mixed in an extrusion apparatus, e.g. a screw extrusion apparatus, or the fibrous material and thermoplastic material may be calendered into a sheet form, e.g. by passing the mixture repeatedly through the nip between a pair of rollers rotating at different peripheral speeds. Although the mixing technique may result in some breakage of fibrous material such as to result in a reduction in the L/D ratio, it is preferred that the mixing technique should not be so severe as to result in substantial breakage of fibrous material such that the L/D ratio of a substantial proportion of the fibrous material is reduced below 50.

A particularly suitable technique for forming a homogeneous mixture of an electrically conducting fibrous material and a thermoplastic plastics material is a pull-trusion process in which a rope of fibrous material is fed into an extrusion apparatus to which molten plastics material is also charged and from which the rope of fibrous material admixed with plastics material is pulled via an orifice. The thus formed rope of fibrous material mixed with plastics material is chopped into pieces of suitable lengths which may be formed into an electrode of desired shape by conventional plastics processing techniques, e.g. injection moulding or compression moulding.

Where the plastics material is a thermosetting material the latter material may be, for example, an epoxy resin, a phenolic resin, or a polyurethane resin. Such resins are well known in the art. Where the plastics material is a thermosetting material the fibrous material may be mixed therewith by known techniques.

The plastics material of the composition of the electrode may comprise two or more different plastics materials, particularly two or more different thermoplastic materials.

Mixing of the composition of electrically conducting fibrous material and the plastics material may be assisted by using an electrically non-conducting fibrous material in the mixing process which acts as a carrier for the electrically conducting fibrous material. The electrically non-conducting fibrous material may be, for example, glass fibre or a fibre of an organic polymeric material, e.g. a polyamide or a polyester fibre.

The L/D ratio of the electrically conducting fibrous material after the composition has been formed into an electrode may be determined by removing the plastics material, for example, by use of a suitable solvent, isolating the fibrous material, and examining the fibrous material.

The shape of the electrode will be chosen to suit the particular electrochemical cell in which it is to be installed. The electrode may be in the form of a planar sheet, in which case it may be produced by the calendering method hereinbefore referred to, or by extrusion, by injection moulding, or by compression moulding of a composition of thermoplastic material and electrically conductive fibrous material. The composition may suitably be in the form of pre-mixed pellets.

The electrode may have a more complicated profile. For example, it may be in the form of a ribbed plate, the ribs suitably being vertically positioned when the electrode is positioned in an electrochemical cell. The ribs serve to increase the surface area of the electrode, to strengthen the electrode, and to provide channels for release of gas which may be produced in electrolysis. Such a ribbed plate may be produced, for example, by extrusion, injection moulding or compression moulding.

The electrode may have a foraminate structure. For example it may be in the form of a mesh or of a plate having holes therein. Such a structure may be formed by injection moulding or compression moulding of the composition.

Where the plastics material is a thermosetting material the electrode may, for example, be produced by casting a composition of thermosetting material and electrically conductive fibrous material into a suitably shaped mould, and causing the thermosetting material to set.

The electrode comprises a composition of a plastics material and an electrically conducting fibrous material having an L/D ratio of at least 50. It may also comprise other materials. For example, although it is not necessary to use electrically conducting materials other than the fibrous material in order to achieve the necessary electrical conductivity in the electrode, the possibility of the electrode comprising other materials is not excluded. For example, the electrode may also comprise particulate electrically conducting material, for example, metal powder, e.g. powdered film-forming metal, noble metal, nickel, iron or copper; graphite or carbon black; particulate noble metal oxide, that is particulate oxide of platinum, ruthenium, rhodium, palladium, osmium and/or iridium. The electrode may comprise electrically non-conducting particulate material in order to modify the physical and mechanical properties of the plastics material. The electrode may comprise fibrous material which is not electrically conducting, and/or it may contain electrically conducting fibrous material having an L/D ratio of less than 50.

The electrode may have a metallic conductor associated therewith, and in particular it may have such a conductor embedded in the composition. The metallic conductor may have a foraminate structure, e.g. a mesh structure, and it may act as a current distributor, particularly when the electrode is used as a monopolar electrode. The metallic conductor may project from an edge of the electrode in order to provide a means for attachment of the electrode to a source of electrical power.

The electrode may carry a surface layer which, for example, makes the electrode particularly suitable for use in a particular type of electrochemical cell. Thus, the electrode may have a metallic surface layer, which may be of a film-forming metal when the electrode is to be used as an anode in a chlor-alkali cell, or of iron, copper or nickel when the electrode is to be used as a cathode in a chlor-alkali cell. The surface of the electrode may have a coating of an electrocatalytically active material, which material may be deposited directly on the electrode surface or on the metallic layer hereinbefore referred to. For example, the electroconducting material may comprise, in the case of an electrode for use as an anode, an oxide of a platinum group metal, preferably in admixture with an oxide of a film-forming metal, and in the case of an electrode for use as a cathode, a platinum group metal, or a mixture thereof. Such coatings, and others for use in electrochemical cells, particularly chlor-alkali cells, are well-known in the art.

The electrode may be a monopolar electrode, or it may be a bipolar electrode in which case one surface of the electrode serves as an anode and one surface serves as a cathode.

In a further embodiment of the present invention there is provided an electrochemical cell which comprises at least one anode and at least one cathode and in which at least one of said anode or cathode is an electrode as hereinbefore described. Both the anode and cathode may comprise an electrode as hereinbefore described. The electrochemical cell may be a monopolar cell which comprises separate anodes and cathodes, or it may be a bipolar cell in which each electrode serves as an anode and a cathode, one side of the electrode providing the anode and the opposite side of the electrode providing the cathode.

The electrochemical cell may comprise, but does not necessarily comprise, a separator positioned between each anode and adjacent cathode thereby dividing the cell into separate anode and cathode compartments.

The separator may be a hydraulically permeable diaphragm or a substantially hydraulically impermeable ion-exchange membrane.

Where the separator is a hydraulically permeable diaphragm it may be made of a porous organic polymeric material. Preferred organic polymeric materials are fluorine-containing polymeric materials on account of the generally stable nature of such materials in the corrosive environment encountered in chlor-alkali electrolytic cells. Suitable fluorine-containing polymeric materials include, for example, polychlorotrifluoroethylene, fluorinated ethylene-propylene copolymer, and polyhexafluoropropylene. A preferred fluorine-containing polymeric material is polytetrafluoroethylene on account of its great stability in the corrosive environment of a chlor-alkali electrolytic cell.

Such hydraulically permeable diaphragm materials are known in the art.

Preferred separators for use as ion-exchange membranes which are capable of transferring ionic species between the anode and cathode compartments of an electrolytic cell are those which are cation selective. Such ion exchange membranes are known in the art and are preferably fluorine-containing polymeric materials containing anionic groups. The polymeric materials preferably are fluorocarbons containing the repeating groups $$[C_mF_{2m}]_M \text{ and } [CF_2-CF]_N$$
$$\phantom{xxxxxxxxxxxxxx}|$$
$$\phantom{xxxxxxxxxxxxxx}X$$

where m has a value of 2 to 10, and is preferably 2, the ratio of M to N is preferably such as to give an equivalent weight of the groups X in the range 600 to 2000, and X is chosen from $$A \text{ or } [OCF_2-CF]_pA$$
$$\phantom{xxxxxxxxxxxx}|$$
$$\phantom{xxxxxxxxxxxx}Z$$

where p has a value of for example 1 to 3, Z is fluorine or a perfluoroalkyl group having from 1 to 10 carbon atoms, and A is a group chosen from the groups:
—SO$_3$H
—CF$_2$SO$_3$H
—CCl$_2$SO$_3$H
—X$^1$SO$_3$H
—PO$_3$H$_2$
—PO$_2$H$_2$
—COOH and
—X$^1$OH or derivatives of the said groups, where X$^1$ is an aryl group. Preferably A represents the group SO$_3$H or —COOH. SO$_3$H group-containing ion exchange membranes are sold under the tradename 'Nafion' by E I du Pont de Nemours and Co Inc and —COOH group-containing ion exchange membranes under the tradename 'Flemion' by the Asahi Glass Co. Ltd.

In the electrochemical cell the anodes, cathodes, and separators may be assembled by conventional means.

However, in a preferred embodiment the anodes and cathodes are affixed to frame members of an electrically non-conducting plastics material and the frame members are bonded directly or indirectly to each other. Such a preferred form of electrochemical cell is less susceptible to leakage of liquors than is a conventionally assembled electrochemical cell, particularly when the cell is operated at a pressure above atmospheric pressure.

The separator may be positioned between adjacent frame members. It may be sealed to one or other or to both of the frame members, or it may merely be held in position by being trapped between the frame members. Thus, the separator may have a surface area greater than that of the anode or cathode but not so great as to cover the entire face of a frame member. The separator may be positioned in a recess in the frame member and sealed thereto. In this embodiment of the electrolytic cell the frame members of electrically non-conducting plastics material to which the anodes and cathodes are affixed are sealed directly to each other with a separator trapped therebetween.

In an alternative embodiment, the separator may be positioned within and sealed to a frame member of an electrically non-conducting plastics material. This separator frame member may be positioned between frame members to which anodes are affixed and frame members to which cathodes are affixed and be bonded thereto. In this case the anode and cathode frame members are bonded indirectly to each other via the separator frame member.

The electrolytic cell may comprise frame members of an electrically non-conducting plastics material other than those to which the anodes and cathodes are affixed or to which the separators are affixed. For example, the electrolytic cell may comprise such frame members having a central opening therein to provide in the electrolytic cell a space for the anode and cathode compartments. Such a frame member may be positioned in the electrolytic cell between the separator, or frame member associated with the separator, and an adjacent anode frame member, and between the separator, or frame member associated with the separator, and an adjacent cathode frame member. Alternatively, space for the anode and cathode compartments may be provided by using anode and cathode frame members, and/or separator frame members of a thickness such as to provide the required space. For example, the anode and cathode frame member may have a central opening therein in which the anode and cathode respectively are positioned and the frame members may have a thickness greater than that of the anode and cathode.

References to anode frame members and cathode frame members apply to the case where the electrodes are monopolar. In the case of a bipolar electrode a single electrode, which functions both as an anode and a cathode, may be affixed to a frame member.

The plastics material of the frame members may be the same as or different from that of the composition of the electrode.

Bonding of frame members may be effected by a variety of different techniques, dependent in part on the nature of the plastics material.

In general, bonding by means of adhesives may be effected with a wide variety of plastics materials of different types, for example, halogenated polyolefins, e.g. polyvinyl chloride, and plastics materials of the acrylonitrile-butadiene-styrene type. Of course, the nature of the adhesive will be selected for the particular plastics material which is to be bonded.

Thermal welding is a suitable means of effecting bonding of polyolefins, chlorinated polyolefins, e.g. polyvinyl chloride, and fluorine-containing polyolefins, and plastics materials of the acrylonitrile-butadiene-styrene type. Thermal welding may be effected for example, by positioning metallic wires, e.g. in the form of a tape, between adjacent frame members and applying pressure thereto, and passing an electrical current through the wires to soften the plastics material and effect bonding.

Other methods of bonding which may be applied include solvent bonding and ultrasonic welding.

The electrolytic cell will be provided with means for feeding electrolyte thereto and with means for removing the products of electrolysis therefrom. For example, in the case of a chlor-alkali cell the cell will be provided with means for feeding the aqueous alkali metal chloride solution to the anode compartments and with means for removing chlorine and optionally with means for removing depleted aqueous alkali metal chloride solution from the anode compartments, and the cathode compartments of the cell will be provided with means for removing hydrogen and cell liquor containing alkali metal hydroxide from the cathode compartments, and optionally, and if necessary, with means for feeding water or dilute alkali metal hydroxide solution to the cathode compartments.

Although it is possible for the means for feeding electrolyte and for removing products of electrolysis to be provided by separate pipes leading to or from each of the respective anode and cathode compartments in the cell such an arrangement may be unnecessarily complicated and cumbersome, particularly in an electrolytic cell of the filter press type which may comprise a large number of such compartments. A preferred type of electrolytic cell comprises frame members of plastics material having a plurality of openings therein which in the cell define separate compartments lengthwise of the cell and through which the electrolyte may be fed to the cell, e.g. to the anode compartments of the cell, and the products of electrolysis may be removed from the cell, e.g. from the anode and cathode compartments of the cell. The compartments lengthwise of the cell may communicate with the anode compartments and cathode compartments of the cell via channels suitably positioned in the frame members.

Where the electrolytic cell comprises hydraulically permeable diaphragms there may be two or three openings which define two or three compartments lengthwise of the cell from which electrolyte may be fed to the anode compartments of the cell and through which the products of electrolysis may be removed from anode and cathode compartments of the cell.

Where the electrolytic cell comprises cation permselective membranes there may be four openings which define four compartments lengthwise of the cell from which electrolyte and water or other fluid may be fed respectively to the anode and cathode compartments of the cell and through which the products of electrolysis may be removed from the anode and cathode compartments of the cell.

BRIEF DESCRIPTION OF THE DRAWING

An embodiment of the present invention will now be described with the aid of the accompanying figure which shows an isometric view of an electrolytic cell in which the electrode of the present invention is installed.

The electrolytic cell comprises a frame-like member (1) of an acrylonitrile-butadiene-styrene polymeric material (ABS) having a central opening in which a bipolar electrode (2) is positioned and sealed thereto.

The bipolar electrode (2) comprises a sheet having vertically disposed ribs (3) on both sides thereof. The electrode (2) comprises a homogeneous composition of ABS polymeric material and 3% by volume of nickel fibre having an L/D ratio of approximately 200.

The bipolar electrode (2) is positioned in the frame-like member (1) by positioning the electrode in a suitably shaped mould and charging ABS polymeric material into the mould, for example by injection moulding.

The frame-like member (1) has four openings (4, 5, 6, 7) which serve as locations for tie rods used in assembly of the electrolytic cell, as hereinafter described.

The frame-like member (1) comprises a horizontally disposed opening (8) through the thickness of the frame-like member (1) and a vertically disposed channel (9) which leads from the opening (8) to the anode face of the ribbed bipolar electrode (2), and a horizontally disposed opening (10) through the thickness of the frame-like member (1) and a vertically disposed channel (not shown) which leads from the opening (10) to the opposite, cathode, face of the ribbed bipolar electrode (2).

Similarly, the frame-like member (1) comprises four horizontally disposed openings (11, 12, 13, 14) through the thickness of the frame-like member (1) and four channels (15, 16, 17, 18) respectively associated with said openings, the channels (16, 17) leading from the anode face of the ribbed bipolar electrode (2) to the openings (12, 13 respectively), and the channels (15, 18) leading from the opposite, cathode, face of the ribbed bipolar electrode (2) to the openings (11, 14 respectively).

For the sake of simplicity the channels (9, 15, 16, 17, 18) have been shown to be short. In practice they are in fact of length greater than that shown in order that current leakage effects through the channels may be minimised.

The electrolytic cell also comprises a framelike member (19) of ABS polymeric material having a central opening in which a cation permselective membrane (20) is positioned. The membrane is slightly larger than the central opening in the frame-like member (19) and may be affixed thereto by means of an adhesive. Alternatively, the membrane (20) may be sandwiched between a pair of frame-like sections which are bonded together to form the frame-like member (19). The frame-like member (19) comprises four openings (21, 22, 23 one not shown) corresponding in position to the openings (4, 5, 6, 7) in the frame-like member (1) and which serve as locations for tie rods used in assembly of the electrolytic cell, and six horizontally disposed openings (24, 25, 26, 27 two not shown) corresponding in positon to the openings (11, 12, 13, 14, 8, 10) respectively in the frame-like member (1).

In assembling the electrolytic cell a frame-like member (1) is positioned on four tie rods through the openings (4, 5, 6, 7) and a face of the member (1) is coated with an adhesive comprising ABS polymeric material in an organic solvent, e.g. perchlorethylene. A frame-like member (19) is then positioned on the tie-rods and contacted with the adhesive-coated face of the frame-like member (1). The opposite face of the framelike member (19) is similarly coated with adhesive and another frame-like member (1) is positioned on the tie rods and contacted with the adhesive coated face of the frame-like member (19). In this way a stack of framelike members (1) comprising bipolar electrodes and frame-like members (19) comprising cation permselective membranes is built up, the stack is held in compression until the frame-like members are firmly bonded together, and the tie rods are removed.

In the electrolytic cell the anode compartments are formed by the space between the ribbed anode face of the bipolar electrode (2) and the adjacent membrane (20), and the cathode compartments by the space between the ribbed cathode face of the bipolar electrode (2) and the adjacent membrane (20).

In the electrolytic cell the horizontally disposed openings (8, 10, 11, 12, 13, 14) in the framelike members (1) and the corresponding openings (two not shown, 24, 25, 26, 27) in the frame-like members (19) together form channels lengthwise of the cell through which, respectively aqueous alkali metal chloride solution may be charged to the anode compartments of the cell, water or dilute aqueous alkali metal hydroxide solution may be charged to the cathode compartments of the cell, hydrogen produced by electrolysis may be removed from the cathode compartments, chlorine produced by electrolysis may be removed from the anode compartments, depleted aqueous alkali metal chloride solution may be removed from the anode compartments, and aqueous alkali metal hydroxide solution produced by electrolysis may be removed from the cathode compartments.

Assembly of the electrolytic cell is completed by sealing end plates (not shown) to each end of the cell, completing electrical connections, and connecting to appropriate headers the channels of which the openings (8, 10, 11, 12, 13 and 14) form a part.

In operation aqueous alkali metal chloride solution is charged to the anode compartments of the electrolytic cell through the lengthwise channel of which opening (8) forms a part and through vertically disposed channel (9), and depleted alkali metal chloride solution and chlorine produced in the electrolysis are removed from the anode compartments, respectively, through the channel (17) and the lengthwise channel of which opening (13) forms a part, and through channel (16) and the lengthwise channel of which opening (12) forms a part.

Water or dilute alkali metal hydroxide solution is charged to the cathode compartments of the electrolytic cell through the lengthwise channel of which opening (10) forms a part and through a vertically disposed channel (not shown), and alkali metal hydroxide solution and hydrogen produced in the electrolysis are removed from the cathode compartments, respectively, through the channel (18) and the lengthwise channel of which opening (14) forms a part, and through channel (15) and the lengthwise channel of which opening (11) forms a part.

In the following specific Examples there is described the production of a composition suitable for use as an electrode, and the production of an electrode from the composition.

Example

Granules of acrylonitrile-butadiene-styrene polymer, ABS (Cycloluc Grade D - Borg Warner) were charged to a screw extruder which was linked to a pulltrusion apparatus. In the pulltrusion apparatus 1 roving of glass fibre and 6 rovings of 6 micron diameter stainless steel (Bekishield 1K) were passed over an impregnation ladder and then through a 2.79 mm die, and in the apparatus the rovings were impregnated with molten ABS polymer charged from the screw extruder. The impregnated fibrous material removed from the pultrusion apparatus, which comprises 12.75% by weight of glass fibre and 16.5% by weight of stainless steel fibre, corresponding to 2.8% by volume of stainless steel fibre, 6.5% by volume of glass fibre, and 90.7% by volume of ABS was chopped into 10 mm long pieces and the pieces were charged to an injection moulding apparatus and moulded into the form of a plate. The L/D ratio of the stainless steel fibre in the plate was in the range 100 to 500.

The plate had a resistivity of 0.6 ohm cm and was able to carry current at a density of 10 kA/m$^2$ of surface of the plate without excessive heat generation in the plate thus indicating that the plate would function as an electrode.

By way of contrast a plate of ABS polymer comprising carbon particles in a proportion of 20 to 35% by weight typically has a resistivity of the order of 100 ohm cm.

I claim:

1. An electrode suitable for use in an electrochemical cell and consisting essentially of a composition of a plastics material and an electrically conducting fibrous material in which the fibres of the fibrous material have a ratio of length to diameter of at least 50 and in which the composition comprises from 1% to 20% by volume of electrically conducting fibrous material, the electrical conductivity of the fibrous material, the volume of said fibrous material and the ratio of length to diameter alone being sufficient to provide the electrode with the necessary electrical conductivity for use in an electrochemical cell.

2. An electrode as claimed in claim 1 in which in the composition the ratio of length to diameter of the electrically conducting fibrous material is at least 100.

3. An electrode as claimed in claim 1 in which the composition comprises not more than 10% by volume of electrically conducting fibrous material.

4. An electrode as claimed in claim 1 in which the bulk electrical resistivity is less than $10^{-1}$ ohm cm.

5. An electrode as claimed in claim 5 in which the bulk electrical resistivity is less than $10^{-4}$ ohm cm.

6. An electrode as claimed in claims 1 to 6 in which in the composition the diameter of the electrically conducting fibrous material is 0.05 mm or less.

7. An electrode as claimed in claim 1 in which in the composition the electrically conducting fibrous material is metallic.

8. An electrode as claimed in claim 8 in which the metal is selected from a film-forming metal, iron, copper and nickel.

9. An electrode as claimed in claim 1 in which in the composition the electrically conducting fibrous material is a substrate of an electrically non-conducting fibrous material having an electrically conducting coating thereon.

10. An electrode as claimed in claim 1 in which in the composition the plastics material comprises a thermoplastic material.

11. An electrode as claimed in claim 10 in which the thermoplastic material comprises an acrylonitrile-butadiene-styrene polymer.

12. An electrode as claimed in claim 1 in which the composition comprises particulate electrically conducting material.

13. An electrode as claimed in claim 1 which comprise a metallic conductor.

14. An electrode as claimed in claim 1 having a surface coating of an electrocatalytically-active material.

15. An electrochemical cell comprising at least one anode and at least one cathode in which at least one of said anode and said cathode is an electrode as claimed in any one of claim 1.

16. An electrochemical cell as claimed in claim 16 in which a separator is positioned between each anode and adjacent cathode.

17. An electrochemical cell as claimed in claim 15 or claim 16 in which each electrode is affixed to a frame member of an electrically non-conducting plastics material.

* * * * *